Patented Apr. 3, 1945

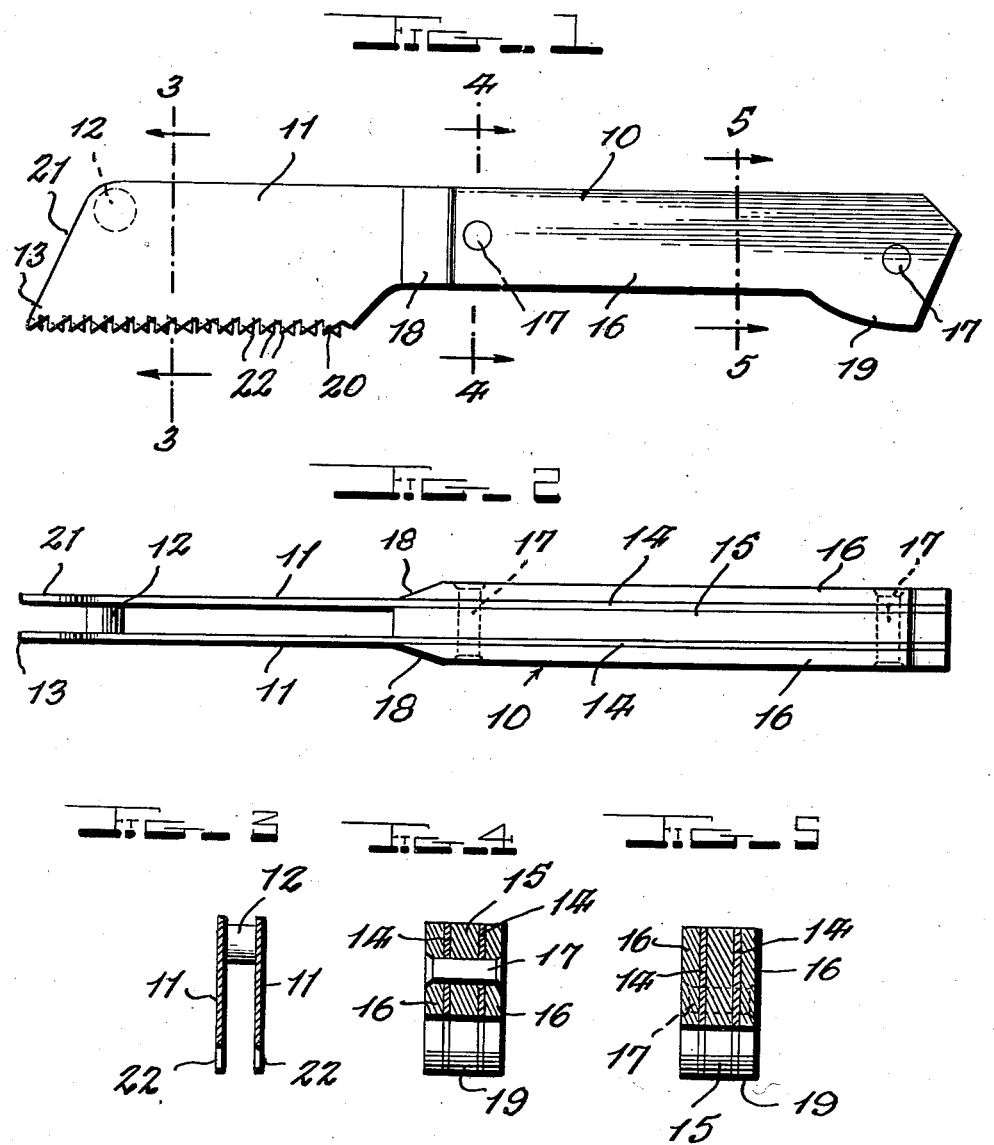

2,372,831

UNITED STATES PATENT OFFICE 2,372,831

FISH SCALING KNIFE

Edward W. Howard, Chicago, Ill.

Application June 8, 1944, Serial No. 539,326

2 Claims. (Cl. 17—7)

This invention relates to cutlery, and more particularly to a fish scaling knife and it consists in the constructions, arrangements and combinations herein described and claimed.

It is the cardinal object of the invention to provide a knife in which a pair of blades are employed, arranged in parallel relation, the blades each having saw-like teeth or serrations, the teeth of one blade being at an angle opposite the teeth of the other blade, thereby enabling ready removal of scales from a fish.

It is also an object of the invention to provide a knife of the character set forth which will gather the scales preventing scattering thereof when in use.

Additional objects, advantages and features of invention will be apparent from the following description considered in conjunction with the accompanying drawing, wherein Figure 1 is a side elevation of the knife constructed in accordance with the invention.

Figure 2 is a top plan view thereof.

Figure 3 is a cross section on the line 3—3 of Figure 1.

Figure 4 is a cross section on the line 4—4 of Figure 1.

Figure 5 is a cross section on the line 5—5 of Figure 1.

There is illustrated a fish scaling knife 10 consisting of a pair of blades 11 held in spaced parallel relation by means of a steel spacer 12 positioned adjacent the upper longitudinal edges of the blades and preferably near the pointed ends 13 of the blades. The spacer 12 may be brazed or welded between respective blades.

The blades 11 are each formed with an integral shank member 14 upon which a handle is assembled as will be described.

A separator 15 of wood plastic or other suitable material is employed of a length the same as that of the shanks 14 and occupies a position between the latter, and in order that the blades shall be in parallel relation, the spacer 15 is the same thickness as the spacer 12. Handle facing strips 16 are secured to respective shanks 14 by means of rivets 17 which pass through aligned openings formed in the strips 16, the shanks 14 and the spacer 15.

The shanks, spacer and facing strips may have any suitable contour to afford comfortable grip and as shown, the front end of the facing strips taper in the direction of the blades so as to afford inclined faces 18 against which an operator may rest his thumb while scaling a fish.

The rear ends of the facing strips 16, the shanks 14 and the spacer strip 15, are each formed upon their under longitudinal edges with an enlarged portion 19, smoothly finished which functions to prevent lateral slippage of the hand of an operator.

The shanks, with spacer strip and facing strips are three-quarters of an inch in width, the shanks merging downwardly, at an angle of sixty degrees to the scaling edge 20. The width of the blades will be one and one-sixteenth inches and have a length of two and five-eighths inches. Thus the scaling edge 20 is disposed a substantial distance below the lower edge of the handle, allowing ample clearance for efficiently drawing the knife across the body of a fish in the act of removing scales.

The front edge 21 of the blades will be formed at an angle of sixty degrees, thus forming the pointed ends 13.

The scaling edge 20 of the blades is defined by a series of angular serrations or teeth 22, the angles defining the teeth of one blade being inclined in a direction opposite that forming the teeth of the other blade. Thus the apices of the teeth will be presented in overlapped relation, effecting a more ready removal of the scales.

In use, the fish will be held by the tail as is usual, the scaling edge 20 being presented transversely across the fish. The knife is now merely moved forwardly under light downward pressure against the scales. The teeth of the foremost blade will remove certain scales of the fish and those which may have been missed will be encountered by the rear blade. It has been found that in use, the scales will accumulate in the space between the blades, thus preventing undue scattering of the scales.

While I have shown and specifically described my knife, this is by way of illustration only, and I consider as my own all such modifications in construction as fairly fall within the scope of the appended claims.

I claim:

1. A fish scaling knife comprising a pair of blades, a spacer block connected between the blades adjacent one end, said blades including a shank, a spacer strip between said shanks, facing strips disposed upon respective outer sides of the shanks of the blades, means connecting said facing strips to the shanks, said means being extended through the shanks and spacer strip; each of said blades having a series of angular shaped teeth along one longitudinal edge, the teeth of one blade being inclined in a direction opposite that of the other blade.

2. The structure of claim 1, in which the width of the blades is such as to present the teeth below the lower edge of the shanks of the blades.

EDWARD W. HOWARD.